(12) United States Patent
Omiya

(10) Patent No.: US 10,922,931 B2
(45) Date of Patent: Feb. 16, 2021

(54) INFORMATION PROCESSING APPARATUS, RECEIPT PRINTER, AND INFORMATION PROCESSING METHOD

(71) Applicant: SEIKO EPSON CORPORATION, Tokyo (JP)

(72) Inventor: Hidehisa Omiya, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/688,506

(22) Filed: Nov. 19, 2019

(65) Prior Publication Data

US 2020/0168056 A1  May 28, 2020

(30) Foreign Application Priority Data

Nov. 22, 2018 (JP) .............................. JP2018-218996

(51) Int. Cl.
| | |
|---|---|
| G07G 1/00 | (2006.01) |
| G07G 5/00 | (2006.01) |
| G07G 1/12 | (2006.01) |
| G06F 3/12 | (2006.01) |
| G06N 3/08 | (2006.01) |

(52) U.S. Cl.
CPC ............ *G07G 5/00* (2013.01); *G06F 3/1206* (2013.01); *G06F 3/1263* (2013.01); *G06F 3/1265* (2013.01); *G06N 3/08* (2013.01); *G07G 1/0018* (2013.01); *G07G 1/12* (2013.01)

(58) Field of Classification Search
None
See application file for complete search history.

(56) References Cited

U.S. PATENT DOCUMENTS

| | | | |
|---|---|---|---|
| 7,344,070 B2* | 3/2008 | Nobutani | G06Q 20/20 |
| | | | 235/383 |
| 2003/0055727 A1* | 3/2003 | Walker | G06Q 30/0238 |
| | | | 705/14.17 |
| 2015/0242169 A1 | 8/2015 | Ito et al. | |
| 2016/0162238 A1 | 6/2016 | Ito et al. | |
| 2018/0032483 A1* | 2/2018 | Omiya | G06F 3/0482 |

FOREIGN PATENT DOCUMENTS

JP            2015-158775 A    9/2015

OTHER PUBLICATIONS

Japanese Appl. No. 2012-027633 to Aonuma et al., published Dec. 9, 2012.*

* cited by examiner

*Primary Examiner* — Paul F Payer
(74) *Attorney, Agent, or Firm* — Workman Nydegger

(57) ABSTRACT

An information processing apparatus is configured which includes an acquisition unit that acquires print data from a receipt printer that prints a printed matter based on the print data, a determination unit that determines a type of the printed matter based on text data included in the print data, and an application unit that selects a script corresponding to the type from a plurality of scripts and applies the selected script to the text data.

13 Claims, 6 Drawing Sheets

FIG. 5

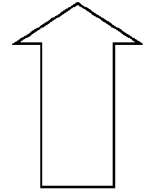

Pr — Retail Receipt
Chk# 334589  02/17/2017  09:30
Cashier: Name A

Milk                                    $4.99
  2%, 1 gallon
Cola                                    $1.29
  1 liter bottle
Blueberries, 2.00 lb                   $42.00
  Organic, $21.00/lb
Coffee                                  $7.39
  Colombia, medium rost, 7oz
Milk                                    $4.99
  2%, 1 gallon
Apples, 1.00 lb                         $1.50
  Gala, $1.50/lb SUBTOTAL                               $62.16
  13% HST                               $8.05

TOTAL       $70.21

Cash tendered: $80.00
       Change: $0.79

St —
```
{
  "printed_at_localtime" : "2017-02-17T09:30:00.000",
  "printed_at" : "2017-02-17T08:30:00.000Z",
  "receipt_id" : "334589",
  "sale_type" : null,
  "taxes" : [{
    "name" : "13% HST",
    "value" : 8.05
  }],
  "staff" : {
    "id" : "Name A",
    "has_original_id" : false
  },
  "products" : [{
    "quantity" : 1,
    "name" : "Milk",
    "price" : 4.99,
    "modifiers" : [{
      "name" : "2%, 1 gallon",
      ...
    }],
  }],
  "total" : 70.21,
  "is_refund" : false,
  "subtotal" : 62.16
}]
```

INFORMATION PROCESSING APPARATUS, RECEIPT PRINTER, AND INFORMATION PROCESSING METHOD

The present application is based on, and claims priority from JP Application Serial Number 2018-218996, filed Nov. 22, 2018, the disclosure of which is hereby incorporated by reference herein in its entirety.

BACKGROUND

1. Technical Field

The present disclosure relates to an information processing apparatus, a receipt printer, and an information processing method.

2. Related Art

A technique has been known which analyzes print data to be printed by a receipt printer used in a POS terminal or the like. For example, JP-A-2015-158775 discloses a technique where when print data is transmitted to a control server, the control server analyzes the print data by a method corresponding to a layout.

When a layout of a printed matter to be printed with print data is unknown, a method of analysis corresponding to the layout is unknown, so that a method is employed where analysis is performed with all possible methods and the most appropriate result is regarded as an analysis result. It takes a long time to perform analysis with all the methods as described above.

SUMMARY

An information processing apparatus according to an embodiment of the present disclosure includes a processor. The processor acquires print data from a receipt printer that prints a printed matter based on the print data, determines a type of the printed matter based on text data included in the print data, selects a script corresponding to the type from a plurality of scripts, and applies the selected script to the text data.

The processor may determine the type by a learning model that is machine-learned based on teacher data where text data and a type of printed matter are associated with each other.

Further, the processor may acquire a possibility that each of a plurality of types is the type of the printed matter and set a priority order for selecting a script corresponding to a type of printed matter so that the higher the possibility of the type, the higher the order.

Further, the processor may select and apply a script according to the set priority order until the selected script is applied to the text data and a result is obtained.

Further, the type of printed matter may include a printed matter indicating a purchase record in a store and a printed matter indicating sales total of the store.

Further, the script may be a program for performing processing that associates an item name included in the text data with a parameter corresponding to the item name.

BRIEF DESCRIPTION OF THE DRAWINGS

FIG. 5 is a diagram showing an example of a printed matter indicating a purchase record and structured data.

DESCRIPTION OF EXEMPLARY EMBODIMENTS

Figure 1:
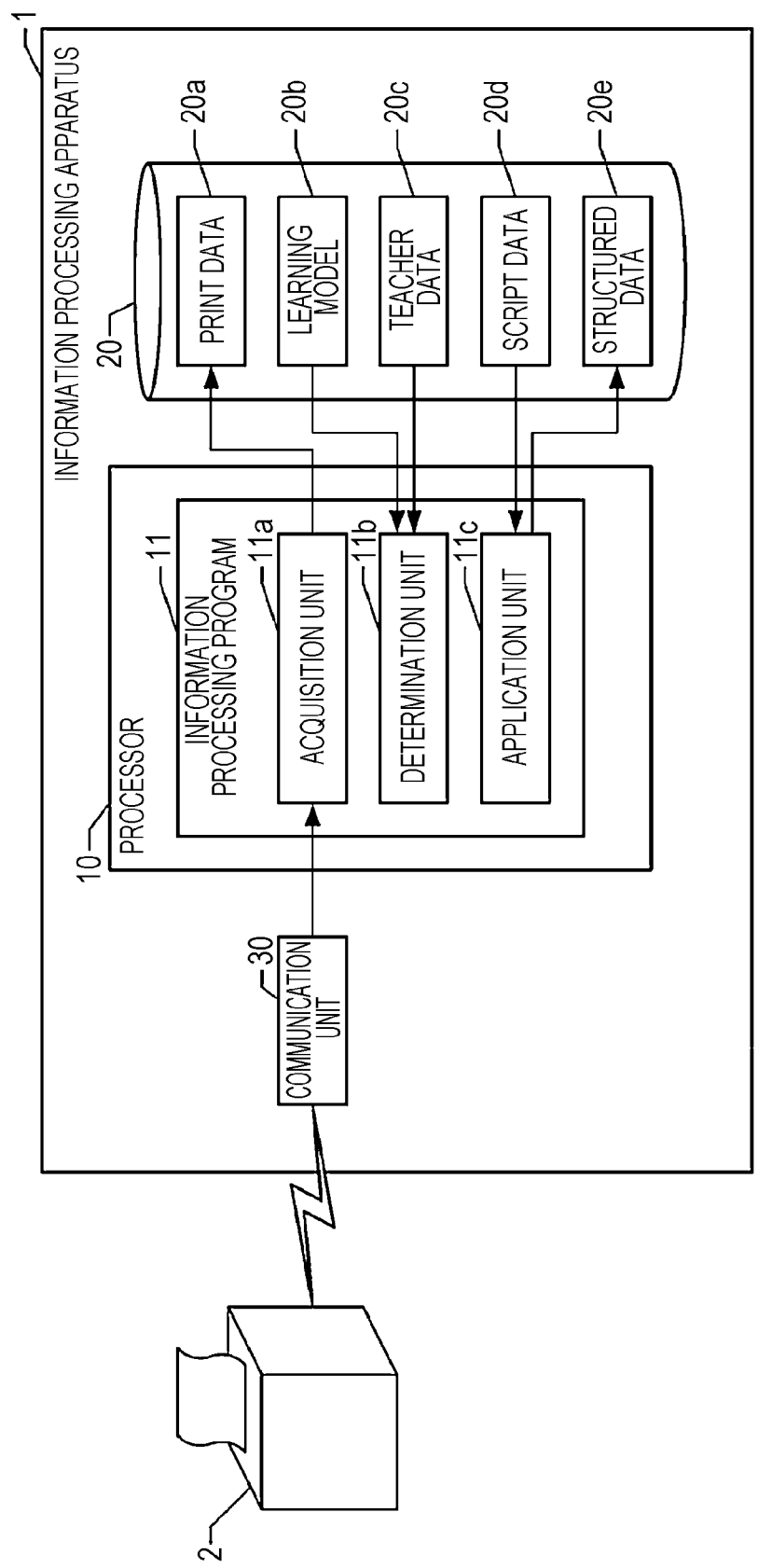
FIG. 1 is a block diagram of an information processing apparatus.

Here, embodiments of the present disclosure will be described according to the following order:
(1) Configuration of information processing apparatus:
(2) Machine learning processing:
(3) Information processing: and
(4) Other embodiments:

(1) Configuration of Information Processing Apparatus:

FIG. 1 is a block diagram showing an information processing apparatus according to an embodiment of the present disclosure. An information processing apparatus 1 according to the present embodiment is a server that can communicate with a receipt printer 2, and can communicate with the receipt printer 2 through a network such as the Internet or the like.

The receipt printer 2 is a printer provided in a register of a store. The receipt printer 2 is used to deliver a printed matter (receipt) indicating a purchase record to each customer who has purchased a commodity in the store. After payment, the receipt is printed from the receipt printer 2 by an operation of an operator. Of course, the receipt printer 2 may have a configuration to cooperate with other devices. For example, the receipt printer 2 may configure part of a POS system (point of sales system).

The receipt printer 2 can print various printed matters by a command from a control apparatus such as a register not shown in the drawings. In the present embodiment, the control apparatus not shown in the drawings can specify and print any one of a printed matter indicating a purchase record in the store, a printed matter indicating sales total of the store, and a printed matter indicating attendance information of people working in the store.

Specifically, the control apparatus can generate print data indicating a purchase record indicating prices and the like of a commodity purchased by a customer by a function of a processor not shown in the drawings. When the control apparatus outputs a control signal to the receipt printer 2 and instructs the receipt printer 2 to perform printing based on the print data, the receipt printer 2 can print a printed matter indicating the purchase record.

The control apparatus can totalize purchase records for each arbitrary period to acquire a sales total and generate print data indicating the sales total. When the control apparatus outputs a control signal to the receipt printer 2 and instructs the receipt printer 2 to perform printing based on the print data, the receipt printer 2 can print a printed matter indicating the sales total of the store. Further, the control apparatus records and manages information related to start and end of working of people who work in the store and can acquire working information by totalizing information for each arbitrary period. The control apparatus can generate print data indicating the working information, and when the control apparatus outputs a control signal to the receipt printer 2 and instructs the receipt printer 2 to perform printing based on the print data, the receipt printer 2 can print a printed matter indicating attendance information of the people who work in the store.

In this way, the receipt printer 2 can print a printed matter indicating the purchase record, and further, the receipt printer 2 can print a printed matter indicating the sales total and a printed matter indicating the attendance information, which are other printed matters. In the present embodiment, the print data transferred to the receipt printer 2 includes text data indicating a text to be printed on a printed matter.

In the present embodiment, the receipt printer 2 has a transmission unit that can transmit print data to the information processing apparatus 1. When a print instruction of a printed matter is issued to the receipt printer 2, the receipt printer 2 performs printing by a print head (printing unit) of the receipt printer 2 based on print data and transmits the print data to the information processing apparatus 1 by a function of the transmission unit. In the present embodiment, the receipt printer 2 and the information processing apparatus 1 are connected, and the print data is transmitted from the receipt printer 2 to the information processing apparatus 1. However, the print data may be transmitted from the control apparatus that controls the receipt printer 2 to the information processing apparatus 1. In this case, it can be regarded that the control apparatus that controls the receipt printer 2 also configures the receipt printer 2. The transmission unit is composed of a communication interface, a communication circuit, a communication port, and the like. The transmission of the print data by the transmission unit may be transmission through wired communication such as USB, Ethernet, and the like, or may be transmission through wireless communication such as Wi-Fi, Bluetooth, and the like (Ethernet, Wi-Fi, and Bluetooth are registered trademarks).

The information processing apparatus 1 includes a processor 10 (control unit), an HDD (hard disk drive, storage unit) 20, and a communication unit 30. The communication unit 30 is an apparatus for communicating with an external device through the Internet or the like and can communicate with the receipt printer 2 to transmit and receive information. The communication unit 30 may have the same hardware configuration as that of the transmission unit of the receipt printer 2 and may perform either wired communication or wireless communication in the same manner as the transmission unit.

The processor 10 includes a CPU, a RAM, and the like and can execute various programs recorded in the HDD 20. In the present embodiment, the programs includes an information processing program 11. The information processing program 11 is a program that causes the processor 10 to perform processing to apply a script to text data included in the print data.

In the present embodiment, the script is a program that describes processing for associating a specific item included in the text data with a parameter indicating content of the item. For example, in the left side of FIG. 5, a printed matter Pr indicating a purchase record is shown. On the printed matter, a date (Feb. 17, 2017) when the printed matter was issued, an operator name (Name A) of the register, a price ($4.99) for each commodity name, and the like are written. The date, the operator name, and the price are variable information, and these are called parameters in the present embodiment.

Information of these parameters themselves (such as a value of the price) has no means, so that information indicating for what purpose these parameters are used is the item. For example, a value itself such as $4.99 does not indicate for what purpose the value is used, so that when the value is associated with a commodity name, the value has a means indicating that the price of a specific commodity is $4.99. Further, for example, a value itself such as Feb. 17, 2017 does not indicate for what date the value is used, so that when the value is associated with information indicating that the value is a date when the printed matter was issued, the value has a means indicating that the date of issue is Feb. 17, 2017.

In this way, the text to be printed on a printed matter in the present embodiment includes a parameter (a character string of a numerical value, a personal name, or the like) and an item indicating for what purpose the parameter is used. Therefore, the script is defined so as to perform processing that analyzes text data, extracts an item and a parameter, and associates them with each other. In the present embodiment, when the processing is performed, text data where the item name and the parameter are associated with each other is generated. Here, the generated text data is called structured data. In the structured data, an item may have a hierarchical structure. Specifically, a certain item may be subdivided into lower sub-items. Of course, the number of hierarchical levels may be three or more. In the structured data shown in FIG. 5, such a hierarchical structure is represented by distinguishing types of brackets.

The right side of FIG. 5 shows an example of structured data St generated from the printed matter Pr. In the structured data St on the right side of FIG. 5, an item name and a parameter are associated with each other by ":". For example, a parameter "02/17/2017" indicating a date when the printed matter was issued is associated with an item name "printed_at". Further, a parameter "Name A" indicating a name of an operator who operated the register is associated with "id" which is an item name of a sub-item of an item "staff". In the printed matter, the item name need not be written. For example, in the printed matter Pr shown on the left side of FIG. 5, although the date when the printed matter was issued is written as a numeric value "02/17/2017", words indicating that "02/17/2017" is the date of issue are not written.

In the present embodiment, it is possible to print three types of printed matters (the printed matter indicating a purchase record, the printed matter indicating sales total, and the printed matter indicating attendance information) as described above, and items and parameters of the printed matters may be different. Therefore, in the present embodiment, a script corresponding to a type of printed matter is prepared and stored in the HDD 20 as script data 20*d*.

When print data is transmitted from the receipt printer 2 to the information processing apparatus 1, the information processing apparatus 1 applies a script to a text data included in the print data. However, when a type of a printed matter to be printed with the print data is unknown, the information processing apparatus 1 cannot decide the script to be applied. When the information processing apparatus 1 intends to apply the script while the type of the printed matter is unknown, the information processing apparatus 1 has to employ a procedure where all types of scripts are applied to the text data and an appropriate result is employed. However, it takes a long time when all the types of scripts are applied to the text data.

Therefore, in the present embodiment, a configuration is employed where a script to be applied is decided after the type of the printed matter is determined. In order to perform such processing, the information processing program 11 includes an acquisition unit 11*a*, a determination unit 11*b*, and an application unit 11*c*. Specifically, when the information processing program 11 is executed, the processor 10 functions as the acquisition unit 11a, the determination unit 11b, and the application unit 11c.

The processor 10 performs a function to acquire print data from a receipt printer that performs printing on a printed matter based on the print data by using the acquisition unit 11a. Specifically, when the print data is transmitted from a receipt printer 2, the processor 10 acquires the print data through the communication unit 30 by a function of the acquisition unit 11a. When the print data is acquired, the print data is recorded in the HDD 20 as print data 20a.

The processor 10 performs a function to determine a type of printed matter based on text data included in the print data by using the determination unit 11b. In the present embodiment, the processor 10 determines a type of printed matter by a learning model that is machine-learned based on teacher data where text data and a type of printed matter are associated with each other.

Figure 2:
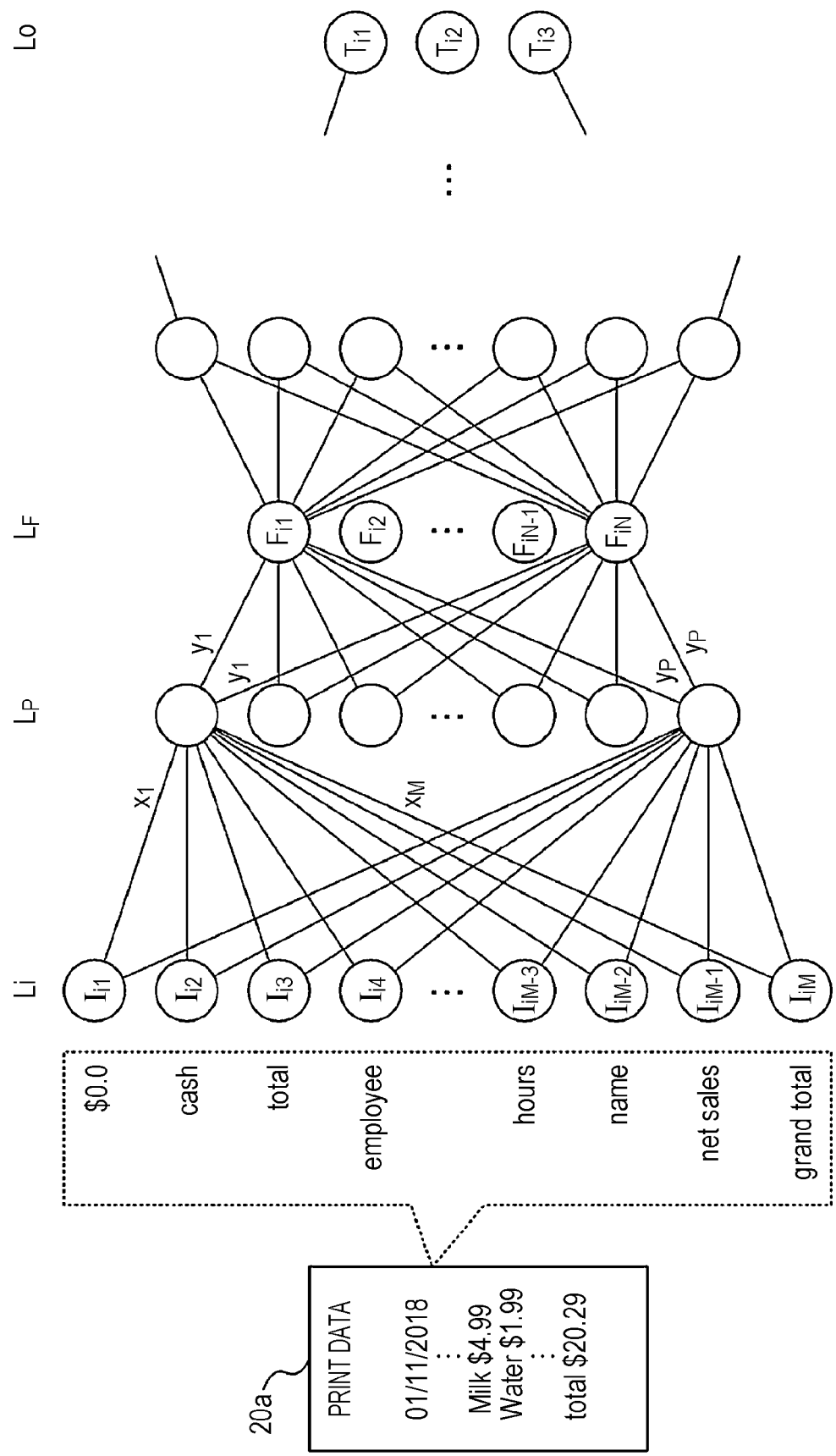
FIG. 2 is a diagram showing a structure of a neural network.

Specifically, the machine learning in the present embodiment is learning by a neural network. FIG. 2 is a diagram schematically showing a structure of the neural network used in the present embodiment. In FIG. 2, a node shaped like a neuron is represented by a circle, and a coupling between nodes is represented by a solid straight line (however, to simplify the drawing, nodes and couplings are only partially shown). Further, in FIG. 2, nodes belonging to the same layer are arranged and shown vertically. The leftmost layer is an input layer Li and the rightmost layer is an output layer Lo.

Here, in a relationship between two layers, a layer close to the input layer Li is called an upper layer, and a layer close to the output layer Lo is called a lower layer. In a certain layer, an output of one-layer-higher layer is used as an input, multiplication of weights and addition of biases are performed, and output is performed through an activation function. For example, when the number of nodes in a layer $L_P$ shown in FIG. 2 is P, data inputted into each node in the layer $L_P$ are $x_1, \ldots, x_M$, biases are $b_1, \ldots, b_P$, weights for a kth node in the layer $L_P$ are $w_{k1}, \ldots, w_{kM}$, and the activation function is h(u), intermediate outputs $u_1, \ldots, u_P$ from each node in the layer $L_P$ are represented by the following formula 1.

$$(u_1 \ldots u_k \ldots u_P) = (x_1 \ldots x_k \ldots x_P) \begin{pmatrix} W_{i1} & \ldots & W_{k1} & \ldots & W_{P1} \\ & & \vdots & & \\ W_{ik} & \ldots & W_{ik} & \ldots & W_{Pk} \\ & & \vdots & & \\ w_{iM} & \ldots & W_{kM} & \ldots & W_{PM} \end{pmatrix} + (b_1 \ldots b_k \ldots b_P) \quad (1)$$

Therefore, when the formula 1 is substituted into an activation function $h(u_k)$, outputs $y_1, \ldots, y_P$ from each node in the layer $L_P$ are obtained.

A model is configured by providing a plurality of nodes to be generalized in this way. Therefore in the present embodiment, the model is configured by data indicating at least the weights, biases, and the activation function in each layer. As the activation function, it is possible to use various functions such as, for example, a sigmoid function, a hyperbolic function (tanh), ReLU (Rectified Linear Unit), and other functions. The activation function is a non-linear function. Of course, the model may include other conditions required to perform machine learning, for example, parameters of a type of optimization algorithm, a learning rate, and the like.

The number of layers, the number of nodes, and a coupling relationship of correlations may have various aspects.

In the present embodiment, a model is constructed where a text data included in the print data 20a is converted into a predetermined input value and inputted into the input layer Li and an output value indicating a type of printed matter is outputted from the output layer Lo. In the present embodiment, a model is constructed where a flag indicating whether or not a keyword is included in the text data is an input value to be inputted into the input layer Li and a value indicating a possibility that the printed matter is a specific type is an output value outputted from the output layer Lo. For example, in FIG. 2, when a keyword "cash" exists in the text data, a numerical value 1 is inputted into a node $I_{i2}$, and when the keyword "cash" does not exist in the text data, a numerical value 0 is inputted into the node $I_{i2}$. Further, when a keyword "grand total" exists in the text data, a numerical value 1 is inputted into a node $I_{iM}$, and when the keyword "grand total" does not exist in the text data, a numerical value 0 is inputted into the node $I_{iM}$. That is to say, each node in the input layer Li shown in FIG. 2 is written alongside with a keyword corresponding to each node.

A method for determining the presence or absence of a keyword may be various methods, and in the present embodiment, a numerical value written in a specific format can be a keyword. For example, "$0.0" shown in FIG. 2 represents a character string in which an arbitrary numerical value, a comma, and an arbitrary numerical value are arranged on the right side of a symbol representing dollar currency, and when a numerical value in this format exists, it is regarded that a keyword exists.

The nodes $T_{i1}$ to $T_{i3}$ of the output layer Lo are three nodes provided according to three types of printed matters in the present embodiment. The nodes $T_{i1}$, $T_{i2}$, and $T_{i3}$ respectively correspond to a printed matter indicating a purchase record, a printed matter indicating sales total, and a printed matter indicating attendance information. After learning of a learning model is completed, when the text data is data of a printed matter indicating a purchase record, an output value of the node $T_{i1}$ is greater than output values of the other nodes. When the text data is data of a printed matter indicating sales total or a printed matter indicating attendance information, an output value of the node $T_{i2}$ or $T_{i3}$ is greater than output values of the other nodes. In the present embodiment, it is standardized so that the sum of the output values of the nodes $T_{i1}$, $T_{i2}$, and $T_{i3}$ is 1. Therefore, the maximum value of the output of each node is 1.

According to the model described above, by inputting an input value indicating the presence or absence of a keyword included in the text data into the mode and calculating an output value of each node, it can be estimated that the greater the output value, the higher the possibility that the type of printed matter corresponds to the node.

A model that has been learned is recorded in the HDD 20 as a learning model 20b. However, the learning model 20b has to be learned before estimating the type of printed matter based on the text data included in the print data. The learning is performed based on teacher data 20c. The teacher data 20c is data where text data and the type of printed matter to be printed with the text data are associated with each other, and a sufficient amount of data for the leaning is collected in advance.

The processor 10 performs learning based on the teacher data 20c at an arbitrary timing by a function of the determination unit 11b. In this case, the processor 10 adjusts a model so that a relationship between the text data and the type of printed matter associated with each other by the teacher data 20c is reproduced by the model shown in FIG. 2. Specifically, the processor 10 specifies the presence or absence of keyword based on each of at least some of text data included in the teacher data 20c and converts each text data into an input value.

Further, the processor 10 inputs the input value into the model and adjusts the model so that the type of printed matter indicated by an obtained output value coincides with the type of printed matter indicated by the teacher data 20c (so that a difference is minimized). When a predetermined leaning completion determination criterion is satisfied by the adjustment, the obtained model is recorded in the HDD 20 as the learning model 20b.

The processor 10 determines the type of printed matter in a state where the learning model 20b is recorded in the HDD 20. Specifically, when the processor 10 acquires the print data 20a, the processor 10 extracts text data from the print data 20a by a function of the determination unit 11b. Then, the processor 10 searches for a keyword from the text data and specifies the presence or absence of each keyword. Further, the processor 10 generates an input value indicating the presence or absence of keyword by a flag (1 or 0) and acquires an output value corresponding to the input value based on the learning model 20b. Then, the processor 10 compares output values of each node and assumes that the greater the value of the output layer, the higher the possibility that the type of printed matter corresponds to the node.

In this way, the possibilities that the types of printed matters to be printed with the print data are each of the three types described above are ranked, so that the type of printed matter is determined. When the type of printed matter is determined, the processor 10 selects a script corresponding to the type of printed matter from a plurality of scripts by a function of the application unit 11c and applies the selected script to the text data.

In the present embodiment, a descending order of possibility to be the type of printed matter to be printed with the print data is specified. Therefore, the processor 10 sets a priority order for selecting a script corresponding to the type of each printed matter so that the higher the possibility of the type, the higher the order. Then, the processor 10 selects and applies a script according to the set priority order until the selected script is applied to the text data and a result is obtained.

The script in the present embodiment is a procedure of processing that associates a specific parameter with an item corresponding to the parameter by detecting a text of a specific format or detecting a combination of a specific keyword and an item name. The processor 10 determines that an application result of a script is obtained when a result obtained when the script is applied satisfies a predetermined determination criterion. The predetermined determination criterion may be decided by various methods. However, in the present embodiment, the determination criterion is whether or not a parameter of an item determined to be essential in advance is obtained in a structured data obtained by applying the script.

In other words, when a parameter of an item determined to be essential is acquired as structured data, the processor 10 determines that a result of the script is obtained. When a parameter of an item determined to be essential is not acquired as structured data, the processor 10 determines that a result of the script is not obtained. Of course, there may be a plurality of items determined to be essential.

The processor 10 performs the application of the script and the determination whether or not the result is obtained according to the priority order. Specifically, the processor 10 refers to the script data 20d, applies a script corresponding to a type of printed matter whose priority order is the highest to text data of the print data 20a, and acquires structured data. The processor 10 determines whether or not the result of the script is obtained based on the structured data, and when the result is obtained, the processor 10 completes the application of the script.

On the other hand, when the result is not obtained, the processor 10 applies a script of the next priority order to the text data of the print data 20a and determines whether or not the result is obtained based on the structured data. Thereafter, the processor 10 repeats processing that moves down the priority order by one level, applies the script, and determines whether or not the result is obtained until determining that the result is obtained.

According to the embodiment as described above, the processor 10 selects and applies a script corresponding to the type of printed matter based on the text data included in the print data 20a. Further, in the present embodiment, the script is applied in descending order of possibility to be the type of printed matter to be printed with the text data. As a result, even when all types of scripts are not applied, it is possible to increase possibility that an appropriate script can be applied to the text data.

When the structured data is obtained from the print data 20a by the processing described above, the structured data is recorded in the HDD 20 as structured data 20e, and the structured data 20e can be used for various analyses. For example, the structured data 20e of a plurality of print data 20a are provided to ISV (independent software vendor) and the like and used for various analyses, development of software, and the like.

Figure 3:
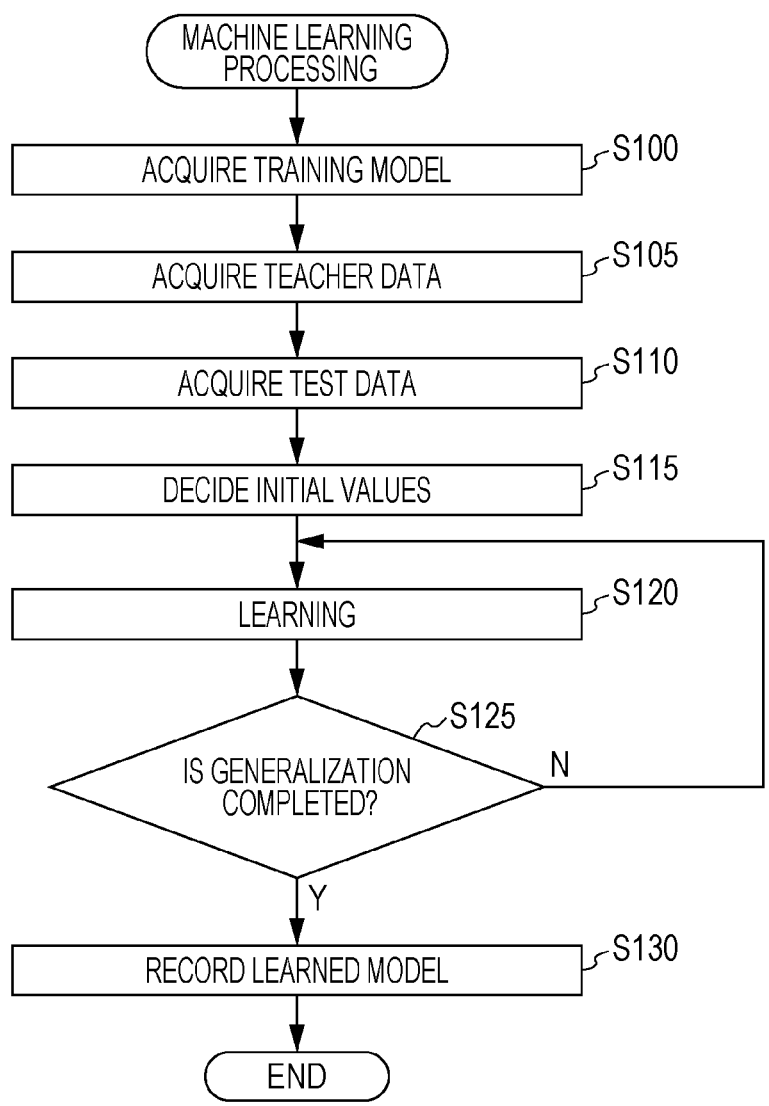
FIG. 3 is a flowchart showing machine learning processing.

(2) Machine Learning Processing:

Next, machine learning processing performed by the processor 10 will be described. FIG. 3 is a flowchart showing the machine learning processing. The machine learning processing is performed in advance to determine a type of printed matter. When the machine learning processing is started, the processor 10 acquires a training model by a function of the determination unit 11b (step S100). Specifically, the processor 10 acquires parameters (weight, bias, and the like) of a predetermined neural network as a training model.

The training model uses the presence or absence of keyword in text data as an input value and outputs an output value indicating a type of printed matter. However, the type of printed matter indicated by the output value is not correct initially. That is to say, in the training model, although the number of layers formed by nodes and the number of nodes are decided, parameters (aforementioned weight, bias, and the like) that define a relationship of input/output is not optimized. These parameters are optimized (in other words, trained) in a process of machine learning. In the present embodiment, the training model is decided in advance. However, the training model may be decided by a user using a mouse 3a and a keyboard 3b.

Next, the processor 10 acquires the teacher data 20c by a function of the determination unit 11b (step S105). That is, the he processor 10 acquires the teacher data 20c that is previously recorded in the HDD 20. The teacher data 20c may be appropriately added in an operation process of the receipt printer 2 or before use of a printed matter of a new format is started. Of course, the teacher data 20c of a printed matter that is abolished along with abolishment or the like of a printed matter of an existing format may be abolished.

Next, the processor 10 acquires test data by a function of the determination unit 11b (step S110). In the present embodiment, a part of the teacher data 20c is the test data. The test data is distinguished from the teacher data 20c. An information amount of the test data and an information amount of the teacher data 20c may be various amounts. However, in the present embodiment, it is set so that the information amount of the teacher data 20c is greater than the information amount of the test data.

Next, the processor 10 decides initial values by a function of the determination unit 11b (step S115). Specifically, the processor 10 gives initial values to variable parameters of the training model acquired in step S100. The initial values may be decided by various methods. For example, random values, zero, and the like may be the initial values, and the initial values may be decided by different ideas between weight and bias. Of course, the initial values may be adjusted so that the parameters are optimized in a process of learning.

Next, the processor 10 performs learning by a function of the determination unit 11b (step S120). Specifically, the processor 10 extracts each text data of the teacher data 20c and converts each text data into an input value based on the presence or absence of keyword in each text data. Then, the processor 10 inputs the input values into the training model acquired in step S100 and calculates an output value indicating a possibility that the printed matter is each type for each type of printed matter. Further, the processor 10 specifies an error by a loss function indicating a difference between the output value and a flag that indicates the type of printed matter associated with each text data. Then, the processor 10 repeats processing that updates a parameter based on a differentiation of a parameter of the loss function for a predetermined number of times.

When the number of samples included in the teacher data 20c is represented by i, the processor 10 acquires an output value ($T_{i1}$ to $T_{i3}$) of ith sample by inputting an input value specified from text data of the ith sample into the training model. On the other hand, information indicating the type of printed matter associated with the teacher data 20c is a value ($t_{i1}$ to $t_{i3}$) corresponding to the type of printed matter. A value corresponding to a specific type of printed matter is 1 and a value corresponding to another type is 0.

Therefore, when representing an output value of the training model as $T_i$ and representing the type of printed matter indicated by the teacher data 20c as $t_i$, the loss function of the ith sample can be represented as $L(T_i, t_i)$. Of course, various functions can be employed for the loss function. For example, a cross entropy error or the like can be employed. The processing that calculates a loss function L as described above is performed on all or some of the samples indicated by the teacher data 20c, and a loss function in one time learning is represented by an average or a total sum of the calculation processing. For example, when the loss function is represented by the total sum, an entire loss function E is represented by the following formula 2.

$$E = \sum_i L_i(T_i, t_i) \quad (2)$$

When the loss function E is obtained, the processor 10 updates the parameter by a predetermined optimization algorithm, for example, such as a probabilistic gradient descent method.

When the parameter is updated as described above for a predetermined number of times, the processor 10 determines whether or not generalization of the training model is completed (step S125). Specifically, the processor 10 inputs an input value calculated from the test data acquired in step S110 into the training model and acquires an output value. Then, the processor 10 acquires estimation accuracy by acquiring the number of coincidences between the type of printed matter corresponding to the greatest output value and the type of printed matter associated with the test data and dividing the number of coincidences by the number of samples of the test data. In the present embodiment, when the estimation accuracy is greater than or equal to a threshold value, the processor 10 determines that the generalization is completed.

In addition to evaluation of generalization performance, verification of validity of hyper-parameter may be performed. Specifically, in a configuration where a hyper-parameter that is a variable amount other than weight and bias, for example, the number of nodes, is tuned, the processor 10 may verify validity of the hyper-parameter based on verification data. The verification data is prepared by, for example, being extracted from the teacher data 20c in advance and being distinguished from the teacher data 20c and the text data.

In step S125, when it is not determined that the generalization of the training model is completed, the processor 10 repeats step S120. In other words, the processor 10 further updates the weight and the bias. On the other hand, in step S125, when it is determined that the generalization of the training model is completed, the processor 10 records the learning model (step S130). That is, the processor 10 records the training model in the HDD 20 as the leaning model 20b. According to a configuration where the type of printed matter is estimated by the learning model 20b obtained in a manner as described above, it is possible to estimate the type of printed matter to be printed with print data based on text data included in arbitrary print data.

Figure 4:
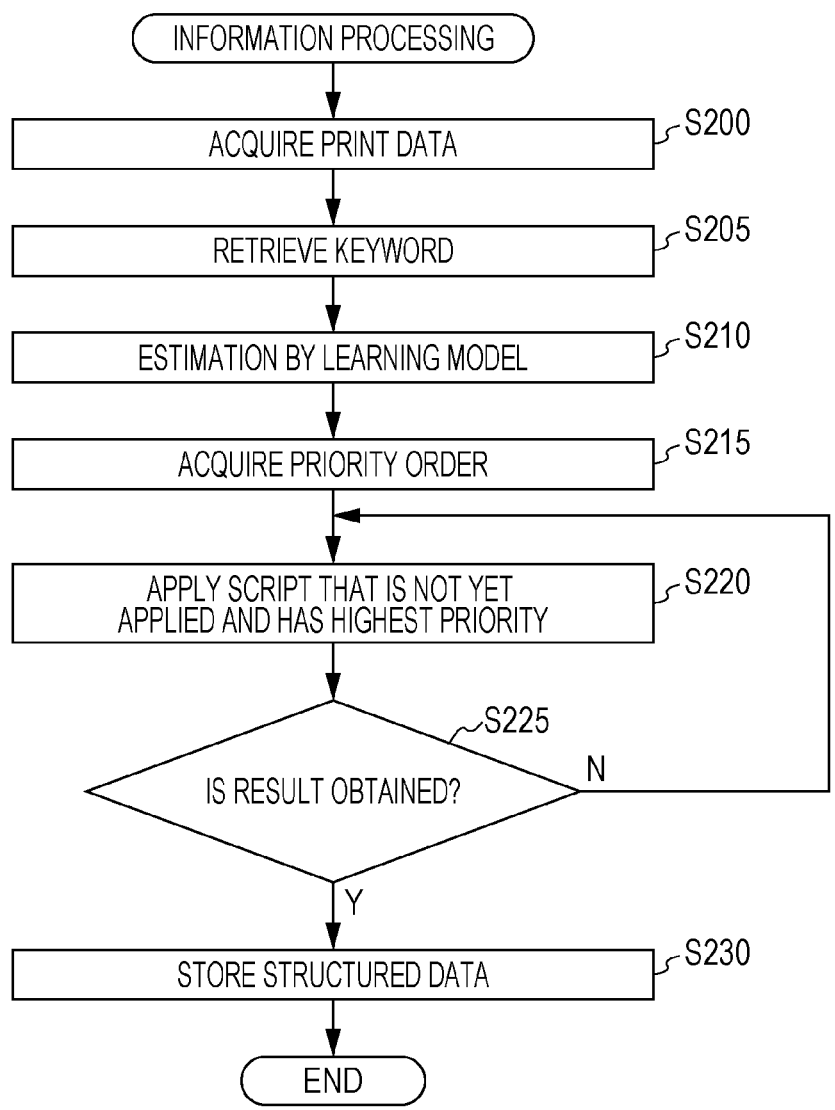
FIG. 4 is a flowchart showing information processing.

(3) Information Processing:

Next, information processing performed by the processor 10 will be described. FIG. 4 is a flowchart showing the information processing. In the present embodiment, the information processing is performed when print data is transmitted from an arbitrary receipt printer 2.

When the information processing is started, the processor 10 acquires the print data by a function of the acquisition unit 11a (step S200). Specifically, the processor 10 communicates with the receipt printer 2 through the communication unit 30 and receives print data transmitted from the receipt printer 2 by the function of the acquisition unit 11a. The processor 10 records the received print data in the HDD 20 as the print data 20a.

Next, the processor 10 performs keyword retrieval by a function of the determination unit 11b (step S205). Specifically, the processor 10 extracts text data from the print data 20a received in step S200 and determines whether or not a predetermined key word exists. The processor 10 associates an existing keyword with 1 and associates a non-existing keyword with 0. For example, in the example shown in FIG. 2, when a keyword of a format shown by "$0.0" exists, a flag is set to 1, when a keyword "cash" exists, a flag is set to 1, and when a keyword "hours" does not exist, a flag is set to 0.

Next, the processor 10 performs estimation by a learning model (step S210). Specifically, the processor 10 performs an arithmetic operation of neural network by using the flag set in step S205 as an input value based on the learning model 20b. As a result, an output value of each node according to the type of printed matter is obtained. For example, in the example shown in FIG. 2, the flag set in step S205 is used as an input value, and when an arithmetic operation by the learning model 20b is performed, an output value of 0 or more and 1 or less is obtained for each of the nodes $T_{i1}$, $T_{i2}$, and $T_{i3}$.

Next, the processor 10 acquires a priority order (step S215). Specifically, the processor 10 estimates that the magnitude of the output value of each node indicates possibility to be a type of printed matter corresponding to each node. Then, the processor 10 arranges the types corresponding to each node in descending order of the output value and uses the arrangement as a priority order when applying a script corresponding to the types.

For example, in the example shown in FIG. 2, the nodes $T_{i1}$, $T_{i2}$, and $T_{i3}$ respectively correspond to a printed matter indicating a purchase record, a printed matter indicating sales total, and a printed matter indicating attendance information. In this example, when the output values of the nodes $T_{i1}$, $T_{i2}$, and $T_{i3}$ are 0.1, 0.85, and 0.05, the priority order of the script corresponding to the printed matter indicating sales total is the highest, the priority order of the script corresponding to the printed matter indicating a purchase record is the second highest, and the priority order of the script corresponding to the printed matter indicating attendance information is the lowest.

Next, the processor 10 applies the script that is not yet applied and has highest priority (step S220) and repeats step S220 until it is determined that a result is obtained (step S225). Specifically, the processor 10 extracts text data from the print data acquired in step S200 and applies the script to the text data in descending order of the priority acquired in step S215. When the script is applied to the text data, structured data is obtained, so that the processor 10 determines whether or not a predetermined determination criterion is satisfied based on the structured data. When the predetermined determination criterion is satisfied, the processor 10 determines that a result is obtained. In step S225, when it is determined that a result is obtained, the processor 10 stores the obtained structured data 20e in the HDD 20 (step S230). According to the configuration described above, the script is applied in descending order of possibility to be the type of printed matter to be printed with the text data. As a result, even when all types of scripts are not applied, it is possible to increase possibility that an appropriate script can be applied to the text data.

(4) Other Embodiments:

The embodiment described above is an example for carrying out the present disclosure, and it is possible to employ various other embodiments. For example, an information processing apparatus according to one embodiment of the present disclosure may be provided in various aspects, and may be provided by a plurality of apparatuses such as a cloud type server. Further, at least some of the functions performed by the information processing apparatus 1 may be performed by the receipt printer 2. For example, the learning model 20b may be stored in the receipt printer 2 and the type of printed matter may be determined in the receipt printer 2. Further, the method of determining the type of printed matter to be printed with the print data based on the text data included in the print data as in the embodiment described above can also be realized as a disclosure of a program and a disclosure of a method.

Further, the machine learning and the determination of the type of printed matter may be performed by different apparatuses. Further, the embodiment described above is an example, and an embodiment whose components are partially omitted and an embodiment to which other components are added may be employed.

The acquisition unit only needs to be able to acquire print data from the receipt printer that prints a printed matter based on the print data. Specifically, the acquisition unit only needs to be able to acquire print data for printing an arbitrary printed matter, at an arbitrary timing. A connection mode between the receipt printer and the information processing apparatus may be various modes. The receipt printer and the information processing apparatus may be able to be directly connected by a cable or may be able to be connected through the Internet or the like.

The receipt printer only needs to be able to print a receipt. Of course, the receipt printer may be able to print printed matters other than a receipt. The receipt only needs to a printed matter indicating a purchase record in a store. Print content and layout of the receipt are not limited as long as the purchase record is printed. The print data only needs to be data for causing the receipt printer to print an arbitrary printed matter and may have an arbitrary format. However, the print data includes text data, and a text indicated by the text data is printed on a printing paper to be a printed matter. Of course, an object other than text may be printed on the printed matter, and data for printing various images, ruled lines, and the like may be included in the print data.

The text data only needs to indicate a character string to be printed on a printed matter. Of course, information such as layout of the text, type and size of font, and the like may be included in the text data. The above information may be used to determine the type of printed matter.

The determination unit only needs to be able to determine the type of printed matter based on the text data included in the print data. Specifically, the text data has a text to be printed on a printed matter, and content of the printed matter is described by the text. Therefore, the text can be used as an element for determining the type of printed matter. The method of determining the type of printed matter is not limited to a configuration that uses a model that has been learned by the machine learning as in the embodiment described above. For example, a configuration may be employed where the type of printed matter is determined by an inclusion rate of a specific keyword according to the type of printed matter in the text indicated by the text data.

The type of printed matter only needs to be sorted by use of the printed matter in advance, and there may be various printed matters other than the printed matter indicating a purchase record in the store, the printed matter indicating sales total of the store, and the printed matter indicating attendance information, which are printed in the embodiment described above. For example, the printed matter may be a printed matter indicating a purchased lottery, a purchased ticket, and the like, a printed matter indicating a payment certificate of utility charges, and various other printed matters.

The application unit only needs to be able to select a script corresponding to the type of printed matter from a plurality of scripts and apply the selected script to the text data. There is a plurality of types of printed matter, and scripts respectively corresponding to the types are prepared in advance. The scripts are prepared according to the types of printed matter, so that there are scripts, the number which is at least the same as the number of types of printed matter. However, a plurality of scripts may be prepared in advance for one type of printed matter.

The script may be a program for performing processing in a predetermined procedure based on the text data, and the language of the script is not limited. The script is often a simple processing procedure. However, of course, content of the processing may be complicated. A purpose of applying a script may be various, and there may be a purpose for each script. As the purpose, in addition to a purpose of extracting an item and a parameter in association with each other and providing them as original data of various analyses as in the embodiment described above, various purposes are assumed. For example, a purpose of collecting information for household budget management based on an amount of money for each commodity included in a purchase record, a total amount of money, and the like, a purpose of collecting information for market research based on sales total of a store, and a purpose of collecting information for labor management based on attendance information, and the like are assumed.

Applying a script to text data corresponds to performing processing of analyzing text data according to a procedure indicated by the script. Here, predetermined processing may be performed based on the text data, and the script may be an interpreter type script or may be a compile type script.

The teacher data only needs to associate text data included in the print data with the type of printed matter to be printed with the print data. The teacher data only needs to be defined by a format that is the same as a format of an input value and an output value of a learning model, and the format is not limited to the format of the embodiment described above. For example, a character string indicated by the text data may be the input value, one-hot vector indicating a character string that may be included in the text data may be defined and used as the input value, and words included in the text data or the number of the words may be the input value. In this way, various configurations may be employed.

When the value derived from the text data is used as the input value, the value may be derived by various methods. For example, character strings or words are retrieved, and the presence or absence of a retrieval result or the number of retrieved character strings or words may be acquired. Further, whether or not currency or time is represented by a specific format may be determined. For example, the presence or absence of price may be specified by retrieving a character string where a sign indicating currency exists on the left side of the character string, several digits of numerical value exists on the right side of the sign, a comma exists on the right side of the numerical value, and a numerical value exists on the right side of the comma. Of course, a regular expression may be used for the retrieval as described above.

The output value may indicate a possibility that a printed matter is each type or a possibility that a printed matter is not each type for a plurality of types of printed matter. A learning model may be generated for each type of printed matter, and a value indicating a possibility that a printed matter is the type for each type of printed matter may be an output value. Further, various other aspects can be expected. Of course, the output value may indicate a script.

A method for machine learning may be various methods. That is, by inputting the text data itself or values derived from the text data (the number of words, the length of a text, the number of spaces, the presence or absence of a personal name, and the like) and constructing a model that outputs the type of printed matter, machine learning may be performed so that an appropriate output is obtained by the model. In the machine learning, learning that minimizes a difference between an output by the model and an output value in the teacher data only needs to be able to be performed.

Therefore, for example, when machine learning by a neural network is performed, the machine learning may be performed by appropriately selecting various elements such as the number of layers that configure a model, the number of nodes, a type of activation function, a type of loss function, a type of gradient descent method, a type of optimization algorithm of the gradient descent method, the presence or absence of mini-batch learning, the number of batches of the mini-batch learning, a learning rate, an initial value, a type of overlearning suppression method, the presence or absence of overlearning suppression method, the presence or absence of convolution layer, a size of filter in an convolution operation, a type of the filter, types of padding and stride, the type and presence or absence of pooling layer, the presence or absence of full connected layer, the presence or absence of recursive structure, and the like. Of course, the learning may be performed by other machine learning such as, for example, support vector machine, clustering, reinforcement learning, and the like.

Further, machine learning where the structure of the model (for example, the number of layers, the number of nodes for each layer, and the like) is automatically optimized may be performed. Further, in a configuration where machine learning is performed in an information processing apparatus, teacher data may be collected from a plurality of receipt printers, and the machine learning may be performed based on the teacher data.

Figure 6:
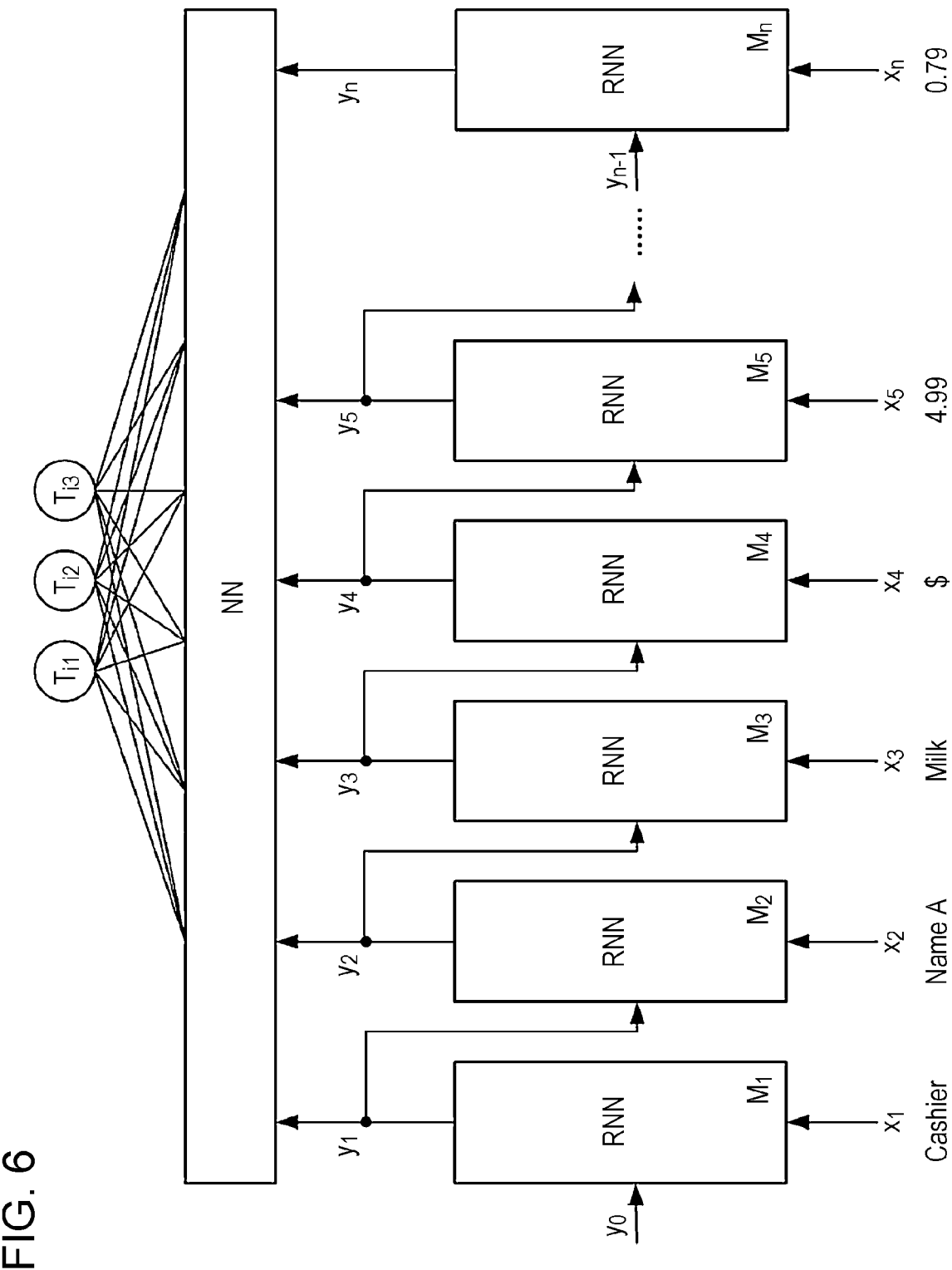
FIG. 6 is a diagram showing a structure of a model including RNN.

Of course, the text data may be processed by RNN (Recurrent Neural Network). According to the RNN, it is possible to take into consideration a front-rear relationship of text data, so that machine learning of a model including processing by the RNN may be used. FIG. 6 is a configuration example of a model including the RNN. In FIG. 6, a text to be an input value is divided into words to be an input value. FIG. 6 shows an example in which a continuous character string "Cashier NameA Milk $4.99 . . . 0.70" that is a part of a text configuring a purchase record is divided into words, "Cashier" is converted into an input value $x_1$, "NameA" is converted into an input value $x_2$, "Milk" is converted into an input value $x_3$, "$" is converted into an input value $x_4$, "4.99" is converted into an input value $x_5$, and thereafter "0.79" is converted into an input value $x_n$.

Further, in FIG. 6, an example is assumed where each input value is inputted into blocks $M_1$ to $M_5$ of the RNN and output values $y_1$ to $y_5 \ldots y_n$ are outputted. In the example shown in FIG. 6, output values $y_1$ to $y_5 \ldots y_{n-1}$ of blocks $M_1$ to $M_5 \ldots M_{n-1}$ of the RNN are inputted into the next blocks $M_2$ to $M_6 \ldots M_n$. A value $y_0$ that is inputted into the first block $M_1$ of the RNN along with the input value $x_1$ may be initialized by various methods (for example, 0 vector or the like). In the example shown in FIG. 6, these output values are inputted into a neural network (NN), and finally, an output value for each node $T_{i1}$, $T_{i2}$, and $T_{i3}$ corresponding to the type of printed matter is obtained.

In the model as described above, various known methods can be used for a method of defining input value and models of RNN and NN of weight, bias, and the like. In the example shown in FIG. 1, the model as described above is assumed, and when the processor 10 performs machine learning by a function of the determination unit 11b, it is possible to machine-learn a model that estimates the type of printed matter to be printed with the print data by inputting text data. Even in such a configuration, by determining the type of printed matter and applying a script according to a determination result, even when all types of scripts are not applied, it is possible to increase possibility that an appropriate script can be applied to the text data. Of course, the model of RNN shown in FIG. 6 is also an example, and various models such as employing a two-way network may be employed.

A possibility that a printed matter is each of a plurality of types may be defined by various methods. Therefore, various configurations other than the above embodiment, where the maximum value of the possibility that the printed matter is a specific type is 1 and the minimum value is 0, may be employed. In any case, it only needs to be able to rank possibilities that the printed matter to be printed with the print data is each of a plurality of printed matters by a magnitude relationship of numerical values indicating that the printed matter is a specific type. The priority order may be specified by the ranking.

Whether or not the selected script is applied to the text data and a result is obtained may be determined by a predetermined determination criterion. Therefore, besides a configuration which assumes that a result is obtained when data that is made essential in advance in structured data is obtained in a configuration where a script outputs predetermined structured data as in the embodiment described above, various configurations may be employed. For example, there is a configuration where it is determined that an application result of a script is obtained when an error occurrence ratio, a ratio where a correspondence relationship between an item and a parameter becomes unstable, or the like are smaller than or equal to a threshold value when a script is applied.

Further, the present disclosure can also be applied as a program or a method executed by a computer. The program and the method as described above may be realized as a single apparatus or may be realized by using components included in a plurality of apparatuses, so that the program and the method include various aspects. The present disclosure can be appropriately modified such as that the present disclosure is partially software and partially hardware. Further, the present disclosure is also established as a recording medium of a program. Of course, the recording medium of a program may be a magnetic recording medium, a semiconductor memory, or any recording medium to be developed in the future.

What is claimed is:

1. An information processing apparatus comprising:
    a processor, wherein the processor is configured to:
        acquire print data from a receipt printer that prints a printed matter based on the print data,
        determine a type of the printed matter based on text data included in the print data,
        select a script corresponding to the type from a plurality of scripts,
        apply the selected script to the text data, and
        determine the type by a learning model that is machine-learned based on teacher data where the text data and the type of the printed matter are associated with each other.

2. The information processing apparatus according to claim 1, wherein
    the processor is configured to
    acquire a possibility that each of a plurality of the types is the type of the printed matter, and
    set a priority order for selecting the script corresponding to the type so that the higher the possibility of the type, the higher the priority order.

3. The information processing apparatus according to claim 2, wherein
    the processor is configured to select and apply the script according to the set priority order until the selected script is applied to the text data and a result is obtained.

4. The information processing apparatus according to claim 1, wherein the type of the printed matter includes the printed matter indicating a purchase record in a store and the printed matter indicating sales total of the store.

5. The information processing apparatus according to claim 1, wherein
    the script is a program for performing processing that associates an item name included in the text data with a parameter corresponding to the item name.

6. A receipt printer comprising:
    a print head that prints a printed matter based on print data; and
    a communication interface configured to transmit the print data to the information processing apparatus according to claim 1.

7. An information processing method comprising:
    an acquisition step of acquiring print data from a receipt printer that prints a printed matter based on the print data;
    a determination step of determining a type of the printed matter based on text data included in the print data, the type is determined by a learning model that is machine-learned based on teacher data where the text data and the type of the printed matter are associated with each other; and
    an application step of selecting a script corresponding to the type from a plurality of scripts and applying the selected script to the text data.

8. The information processing apparatus according to claim 7, wherein
    a possibility that each of a plurality of the types is the type of the printed matter is acquired, and
    a priority order for selecting the script corresponding to the type is set so that the higher the possibility of the type, the higher the priority order.

9. The information processing apparatus according to claim 8, wherein
    the processor selects and applies the script according to the set priority order until the selected script is applied to the text data and a result is obtained.

10. The information processing apparatus according to claim 7, wherein
    the type of the printed matter includes the printed matter indicating a purchase record in a store and the printed matter indicating sales total of the store.

11. The information processing apparatus according to claim 7, wherein
    the script is a program for performing processing that associates an item name included in the text data with a parameter corresponding to the item name.

12. An information processing apparatus comprising:
    a processor, wherein
    the processor is configured to:
        acquire print data from a receipt printer that prints a printed matter based on the print data,
        determine a type of the printed matter based on text data included in the print data,
        select a script corresponding to the type from a plurality of scripts,
        apply the selected script to the text data,
        acquire a possibility that each of a plurality of the types is the type of the printed matter, and
        set a priority order for selecting the script corresponding to the type so that the higher the possibility of the type, the higher the priority order.

13. An information processing method comprising:
    an acquisition step of acquiring print data from a receipt printer that prints a printed matter based on the print data;

a determination step of determining a type of the printed matter based on text data included in the print data;

an application step of selecting the script corresponding to the type from a plurality of scripts and applying the selected script to the text data;

an acquiring step of acquiring a possibility that each of a plurality of the types is the type of the printed matter; and a setting step to set a priority order for selecting the script corresponding to the type so that the higher the possibility of the type, the higher the priority order.

\* \* \* \* \*